United States Patent
Zhao et al.

(10) Patent No.: US 10,527,309 B2
(45) Date of Patent: Jan. 7, 2020

(54) BUILDING AIR CONDITIONING CONTROL SYSTEM AND CONTROL METHOD THEREOF

(71) Applicant: Carrier Corporation, Farmington, CT (US)

(72) Inventors: Jianwei Zhao, Shanghai (CN); Qiang Li, Shanghai (CN); Lijia Zhao, Shanghai (CN); Sanming Wen, Shanghai (CN); Jiahuan Zhou, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/760,938

(22) PCT Filed: Sep. 1, 2016

(86) PCT No.: PCT/US2016/049933
§ 371 (c)(1),
(2) Date: Mar. 16, 2018

(87) PCT Pub. No.: WO2017/048525
PCT Pub. Date: Mar. 23, 2017

(65) Prior Publication Data
US 2018/0259215 A1    Sep. 13, 2018

(30) Foreign Application Priority Data

Sep. 17, 2015   (CN) .......................... 2015 1 0592206

(51) Int. Cl.
*F24F 11/64*   (2018.01)
*F24F 11/30*   (2018.01)
(Continued)

(52) U.S. Cl.
CPC .............. *F24F 11/64* (2018.01); *F24F 11/30* (2018.01); *F24F 11/62* (2018.01); *F24F 11/79* (2018.01);
(Continued)

(58) Field of Classification Search
CPC .. F24F 11/64; F24F 11/79; F24F 11/62; F24F 11/30; F24F 2110/10; F24F 2120/12; F24F 2120/10; G05B 2219/2614
See application file for complete search history.

(56) References Cited

U.S. PATENT DOCUMENTS 6,415,205 B1 *   7/2002   Myron ............... G06K 9/00335
340/522
6,615,175 B1 *   9/2003   Gazdzinski ............... B66B 1/34
187/396

(Continued)

FOREIGN PATENT DOCUMENTS

EP    2650851 A1    10/2013
JP    H04256678 A    9/1992
(Continued)

OTHER PUBLICATIONS

International Search Report and Written Opinion for application PCT/US2016/049933, dated Sep. 1, 2016, 10 pages.

(Continued)

*Primary Examiner* — Christopher E. Everett
(74) *Attorney, Agent, or Firm* — Cantor Colburn LLP

(57) ABSTRACT

A building air conditioning control system for controlling the comfort degree of air in at least one floor area of the building, and includes: a first head counting module to acquire first head count change data of a floor area according to a weight change of a cabin of an elevator when passing the corresponding floor area; a second head counting module to acquire second head count change data of the floor area (Continued)

according to data acquired by an image sensor mounted in the corresponding floor area; and an air conditioning control module to correct head count change data based on the first head count change data and the second head count change data, and control the comfort degree of air in the floor area based on the corrected head count change data. The building air conditioning control system and control method provide accurate control and good user experiences.

15 Claims, 2 Drawing Sheets

(51) Int. Cl.
*F24F 11/62* (2018.01)
*F24F 11/79* (2018.01)
*F24F 120/10* (2018.01)
*F24F 120/12* (2018.01)
*F24F 110/10* (2018.01)

(52) U.S. Cl.
CPC ....... *F24F 2110/10* (2018.01); *F24F 2120/10* (2018.01); *F24F 2120/12* (2018.01); *G05B 2219/2614* (2013.01)

(56) References Cited

U.S. PATENT DOCUMENTS

| | | | | |
|---|---|---|---|---|
| RE40,437 E | * | 7/2008 | Rosen | G05D 23/1931 |
| | | | | 700/277 |
| 7,529,646 B2 | | 5/2009 | Lin et al. | |
| 7,711,565 B1 | * | 5/2010 | Gazdzinski | B66B 3/00 |
| | | | | 187/396 |
| 7,740,112 B2 | | 6/2010 | Iwata et al. | |
| 2003/0096572 A1 | | 5/2003 | Gutta et al. | |
| 2005/0192915 A1 | * | 9/2005 | Ahmed | G06N 3/02 |
| | | | | 706/21 |
| 2007/0045431 A1 | | 3/2007 | Chapman, Jr. et al. | |
| 2009/0065596 A1 | * | 3/2009 | Seem | F24F 11/30 |
| | | | | 236/51 |
| 2010/0078266 A1 | * | 4/2010 | Choi | B66B 1/2433 |
| | | | | 187/247 |
| 2010/0295482 A1 | * | 11/2010 | Chemel | H05B 37/029 |
| | | | | 315/312 |
| 2010/0324962 A1 | * | 12/2010 | Nesler | G01R 21/133 |
| | | | | 705/7.36 |
| 2011/0186644 A1 | | 8/2011 | Yoshii et al. | |
| 2012/0066168 A1 | * | 3/2012 | Fadell | G05B 15/02 |
| | | | | 706/52 |
| 2013/0116835 A1 | | 5/2013 | Nowel | |
| 2013/0205214 A1 | * | 8/2013 | Gazdzinski | G06Q 30/0251 |
| | | | | 715/728 |
| 2014/0277757 A1 | | 9/2014 | Wang et al. | |
| 2015/0021005 A1 | | 1/2015 | Land, III | |
| 2015/0068721 A1 | | 3/2015 | Katuri et al. | |
| 2015/0170503 A1 | * | 6/2015 | Wedig | G08B 7/066 |
| | | | | 340/691.5 |
| 2015/0177722 A1 | * | 6/2015 | Chan | G05B 15/02 |
| | | | | 700/275 |
| 2015/0178865 A1 | * | 6/2015 | Anderson | G05B 17/02 |
| | | | | 705/7.25 |
| 2015/0213703 A1 | * | 7/2015 | Filson | H04L 12/1895 |
| | | | | 340/517 |
| 2016/0284206 A1 | * | 9/2016 | Boettcher | G08B 29/185 |
| 2016/0313022 A1 | * | 10/2016 | Fisher | G05D 23/1904 |
| 2016/0356633 A1 | * | 12/2016 | Mohan | G01D 21/02 |
| 2019/0004550 A1 | * | 1/2019 | Borean | G05D 23/1904 |

FOREIGN PATENT DOCUMENTS

| | | |
|---|---|---|
| JP | H0826611 A | 1/1996 |
| JP | H09151041 A | 6/1997 |
| JP | H09269262 A | 10/1997 |
| JP | 2008298353 A | 12/2008 |
| JP | 2013103795 A | 5/2013 |
| JP | 2015117080 A | 6/2015 |
| KR | 101093191 B1 | 12/2011 |

OTHER PUBLICATIONS

Swayambhu, Madhukar, "Building Block of the Smart City—A building with BRAINS", available at: https://www.linkedin.com/pulse/building-block-smart-city-brains-madhukar-swayambhu/, published May 15, 2015, 11 pages.

* cited by examiner

BUILDING AIR CONDITIONING CONTROL SYSTEM AND CONTROL METHOD THEREOF

TECHNICAL FIELD

The present invention relates to the field of building intelligent management technologies, and to a building air conditioning control system and a control method thereof.

RELATED ART

In general, a building is provided with an air conditioning system and an elevator system, increasingly more persons in the building go to or leave a floor mainly through the elevator system, and the air conditioning system may provide a relatively comfortable air environment for persons inside by controlling the temperature, the ventilation quantity and the like on each floor area.

Currently, control on the building air conditioning system tends to be intelligent, and one of important ideas is implementing intelligent and dynamic control of the air conditioning system based on the head count of the current floor area. For example, the air conditioning system is controlled to increase the fresh air supply quantity for an increasingly greater head count of the current floor area; therefore, a more comfortable air environment is provided for persons inside the building, and it is conducive to save energy for operating the air conditioning system.

The first building air conditioning control method in the prior art is performing statistical calculation on the number of persons entering/leaving a floor area based on an intelligent terminal such as an image sensor, thereby acquiring the head count change of the current floor area in a certain period of time, and further controlling the air conditioning system based on the head count change data.

The second building air conditioning control method in the prior art is performing statistical calculation on the number of persons leaving and/or entering a cabin of an elevator at a floor area of the elevator system, thereby acquiring the head count change of the current floor area in a certain period of time, and controlling the air conditioning system based on the head count change.

The first method requires that the image sensor has high accuracy in statistics on the head count, and the image sensor tends to calculate the head count change of the current floor area as excessive generally in a case of severe illumination change.

In the second method, generally, a weight sensor is used to collect data directed to the weight of the cabin, so as to calculate the head count change of the current floor area, but this method also has low accuracy, especially when persons in the cabin carry heavy goods, and the weight change does not definitely reflect the head count change of the current floor area.

Therefore, the building air conditioning control system in the prior art tends to have the problem of inaccurate control on the air conditioning system when performing air conditioning control based on the head count of a floor area, and therefore, it is disadvantageous in the comfort degree of air in the floor area.

SUMMARY

An objective of the present invention is to improve the control accuracy of a building air conditioning control system.

To achieve the above or other objectives, the present invention provides the following technical solutions:

According to one aspect of the present invention, a building air conditioning control system is provided, for controlling the comfort degree of air in at least one floor area of the building, comprising:

a first head counting module, for calculating to acquire first head count change data of the floor area according to a weight change of a cabin of an elevator when passing the corresponding floor area;

a second head counting module, for calculating to acquire second head count change data of the floor area according to data acquired by an image sensor mounted in the corresponding floor area; and an air conditioning control module, receiving the first and second head count change data, and configured to: correct head count change data based on the first head count change data and the second head count change data, and control the comfort degree of air in the floor area based on the corrected head count change data.

According to another aspect of the present invention, a control method of a building air conditioning control system is provided, comprising steps of:

calculating to acquire first head count change data of a floor area according to a weight change of a cabin of an elevator when passing the corresponding floor area;

calculating to acquire second head count change data of the floor area according to data acquired by an image sensor mounted in the corresponding floor area; and correcting head count change data based on the first head count change data and the second head count change data, and controlling the comfort degree of air in the floor area based on the corrected head count change data.

The foregoing features and operations of the present invention will become more apparent according to the following descriptions and accompanying drawings.

BRIEF DESCRIPTION OF THE DRAWINGS

The above and other objectives and advantages of the present invention will be more complete and clear through the following detailed descriptions with reference to the accompanying drawings, where identical or similar elements are presented by using the same reference numerals.

DETAILED DESCRIPTION

Some of multiple possible embodiments of the present invention are described in the following, are intended to provide basic understanding on the present invention, and are not intended to determine key or critical elements of the present invention or limit the protection scope of the present invention. It is easily understood that, according to the technical solution of the present invention, persons of ordinary skill in the art can propose various other implementation manners that can be replaced with each other, without departing from the essential spirit of the present invention. Therefore, the following specific implementation manners and the accompanying drawings are merely exemplary descriptions on the technical solution of the present invention, and should not be considered as all of the present invention, or as constraints or limitations on the technical solutions of the present invention.

In the following descriptions, for clarity and simplicity, all components of an air conditioning control system are not shown one by one in the accompanying drawings, and multiple components required by persons of ordinary skill in the art to completely implement the present invention are highlighted in the accompanying drawings, and for persons skilled in the art, operations of various components are familiar and apparent.

Figure 1:
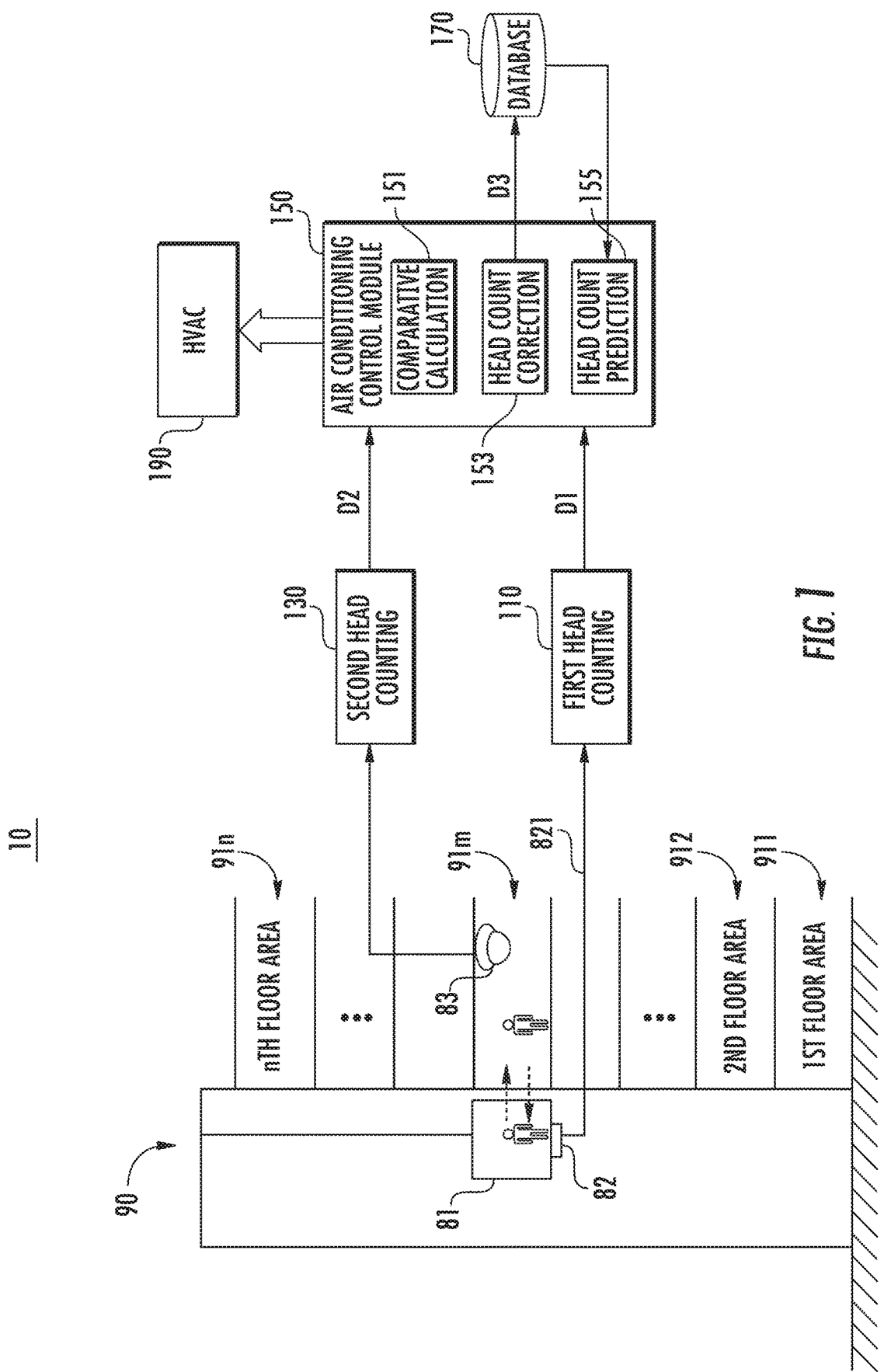
FIG. 1 is a schematic diagram of a building control system according to an embodiment of the present invention.

FIG. 1 is a schematic diagram of a building air conditioning control system according to an embodiment of the present invention. As shown in FIG. 1, for example, an air conditioning system in a building 90 is controlled, and a building air conditioning control system 10 in the embodiment of the present invention may be mounted in the building 90, and controls the air conditioning system thereof. In the present invention, the "building" may be various buildings having elevator systems and air conditioning systems. For example, the building 90 has n floor areas 911, 912 to 91n, where n is greater than or equal to 2. The building air conditioning control system 10 in the embodiment of the present invention may control the comfort degree of air in at least one floor area, and a control principle of the building air conditioning control system 10 in the embodiment of the present invention is illustrated by using a floor area 91m as an example. It should be understood that, the building air conditioning control system 10 may also perform corresponding control on the comfort degree of air in other one or more floor areas.

The building 90 has one or more elevator systems, and each elevator system has a cabin 81 and a corresponding elevator control system. In the present invention, the head count change of the floor area 91m, that is, a difference between the number of persons leaving the floor area 91m and the number of persons entering the floor area 91m, needs to be acquired from the elevator system, and in this way, the head count change condition of the floor area 91m may be reflected. Therefore, in this embodiment, a weight sensor 82 is mounted on the cabin 11, and when the cabin 81 stops at the mth floor, the weight sensor 82 may acquire the weight change of the cabin 81 of the elevator before the door is open and after the door is closed.

The building air conditioning control system 10, on one hand, includes a first head counting module 110. The first head counting module 110 may receive weight change data 821 acquired by the weight sensor 82, so as to substantially acquire first head count change data D1 of the floor area 91m by dividing the weight change data 821 by the average weight of human, and the first head count change data D1 indicates a difference between the number of persons leaving the floor area 91m and the number of persons entering the floor area 91m acquired from the elevator system. When the first head count change data D1 is greater than 0, it indicates that the number of persons entering the floor area 91m is increased, which means the air conditioning system needs to increase the fresh air supply quantity and the like to improve the comfort degree. When the first head count change data D1 is less than 0, it indicates that the number of persons leaving the floor area 91m is increased, which means the air conditioning system needs to reduce the fresh air supply quantity and the like to save the energy consumption of the air conditioning system.

It should be noted that, the first head counting module 110 may receive the weight change data 821 acquired by weight sensors 82 of one or more cabins of a floor area, and determine the first head count change data D1 in a certain period of time based on a sum of the weight change data 821. In another alternative embodiment, the first head counting module 110 may also acquire the weight change data 821 from an elevator control system.

However, the applicant finds that the weight change data 821 is generally difficult to be acquired accurately, for example, it is difficult to be accurately acquired through the weight sensor 82, and therefore, the first head count change data D1 is not definitely truly reflecting the actual head count change of the floor area 91m. Moreover, in particular, the head count change data cannot be always truly acquired by dividing the weight change data 821 by the average weight of human, due to the case in which persons carry heavy goods.

Accordingly, the building air conditioning control system 10 in the embodiment of the present invention, on the other hand, is further provided with a second head counting module 130. The second head counting module 130 calculates to acquire second head count change data D2 of the floor area 91m according to data acquired by one or more image sensors 83 mounted in the corresponding floor area 91m. The image sensor 83 may be mounted in a certain position of the floor area 91m to monitor the head count change. Optionally, it is mounted in a position applicable to acquire the head count change condition of the corresponding floor area 91m, for example, at an entrance/exit of an elevator lobby of the floor area 91m. However, it should be understood that, the position of mounting the image sensor 83 is not limiting, and may be selected and determined according to an internal building structure of the floor area. The image sensor 83 may specifically be a 3D sensor or a 2D smart IP camera, which at least can acquire video information of persons, and preferably can also determine the flow direction of people (for example, entering the floor area 91m or leaving the floor area 91m) and calculate the head count in the video in a certain period of time. Therefore, the second head counting module 130 performs counting based on the video information, and likewise, when the second head count change data D2 acquired by the second head counting module 130 is greater than 0, it indicates that the number of persons entering the floor area 91m is increased, which means the air conditioning system needs to increase the fresh air supply quantity and the like to improve the comfort degree; when the second head count change data D2 is less than 0, it indicates that the number of persons leaving the floor area 91m is increased, which means the air conditioning system needs to reduce the fresh air supply quantity and the like to save the energy consumption of the air conditioning system.

As described in the foregoing, the applicant finds that the counting manner of the second head counting module 130 based on the video information also tends to have the situation of inaccurate counting, especially in the case of severe illumination change, the image sensor 83 tends to count the head count change in the current floor area as excessive, that is, D2 is greater than the actual head count change.

Therefore, the building air conditioning control system 10 in the embodiment of the present invention controls the air conditioning system based on video counting and elevator system counting, that is, controls the air conditioning system based on the data D1 and D2. Therefore, in this embodiment, the building air conditioning control system 10 includes an air conditioning control module 150, which receives the data D1 from the first head counting module 110 and the data D2 from the second head counting module 130, and the air conditioning control module 150 performs weighted averaging on the data D1 and D2 to acquire their weighted average D3, thereby implementing correction on the head count change data, and acquiring the actual head count change data as accurate as possible.

As shown in the foregoing, the first head counting module 110 and the second head counting module 130 each have counting inaccuracy, and therefore, the first head count change data D1 and the second head count change data D2 respectively acquired by them in a certain period of time may not be equal, or have a large difference. In an embodiment, the air conditioning control module 150 is provided with a comparative calculation sub-module 151, which may perform comparative calculation on the first head count change data D1 and the second head count change data D2 received corresponding to a predetermined period of time, so as to acquire relative sizes of the first head count change data D1 and the second head count change data D2. Specifically, in the comparative calculation process, processing is made by using absolute values of the data D1 and D2 (this is because the flow direction of people is relatively easily determined). In this embodiment, the relative size of the data D1 and D2 may be acquired by subtracting the data D2 from the data D1.

Further, in this embodiment, the air conditioning control module 150 is further provided with a head count correction sub-module 153, for correcting the head count change data of the floor area 91m in a certain period of time as accurate as possible. The head count correction sub-module 153 implements correction by means of calculating the weighted average D3 of D1 and D2, that is, calculating the weighted average D3 of the head count change data based on the first head count change data D1 and the second head count change data D2, and specifically, calculating through the following relation (1):

$$D3 = D1 \times f1 + D2 \times f2 \qquad (1)$$

wherein, f1 is a weight corresponding to D1, f2 is a weight corresponding to D2, and f1+f2=1.

The weights f1 and f2 are determined according to the relative sizes of the D1 and D2. In the embodiment of the present invention, when a difference between the first head count change data D1 and the second head count change data D2 is greater than or equal to a first predetermined value d1, that is, D1−D2≥d1, in this case, it is very likely corresponding to the case in which the weight change data is very large since the passengers carry heavy goods, and D1 is counted as being overly large. The goods and passengers are easily distinguished by means of the video information acquired by the image sensor 83, and the data D2 acquired by video counting is relatively more accurate. Therefore, the weight f2 is set to be greater than the weight f1, or even, the weight f2 may be set to 1. In this way, the D3 acquired through calculation can reflect the actual head count change data in the above situations more accurately, so that the head count change data may be corrected more accurately.

It should be noted that, the magnitude of the first predetermined value d1 may be determined according to the head count statistical error caused by the elevator carrying goods, for example, it may be 3, 5 or the like.

In the embodiment of the present invention, when a difference between the second head count change data D2 and the first head count change data D1 is greater than or equal to a second predetermined value d2, that is, D2−D1≥d2, in this case, it is very likely corresponding to the case in which image data is acquired by the image sensor 83 in a special environment condition and D2 is counted as being overly large. The weight change data acquired by the weight sensor 83 of the elevator can reflect the actual head count change situation relatively more accurately, that is, the data D1 acquired by the elevator counting is relatively more accurate. Therefore, the weight f1 is set to be greater than the weight f2, or even, the weight f1 may be set to 1. In this way, D3 acquired through calculation can reflect the actual head count change data in the above situations more accurately, so that the head count change data may be corrected more accurately.

It should be noted that, the magnitude of the second predetermined value d2 may be determined according to the head counting error acquired by the image sensor 83 in a special environment condition (for example, a case of severe illumination change in the environment), for example, it may be 3, 5, 10 or the like.

Further, when the difference between the first head count change data D1 and the second head count change data D2 is less than the first predetermined value d1 and the difference between the second head count change data D2 and the first head count change data D1 is less than the second predetermined value d2, that is, other than the two cases D1−D2≥d1 and D2−D1≥d2, it indicates that errors are obviously less than the above two cases even though D1 or D2 each have some uncertainty. In this way, the weight corresponding to the first head count change data D1 is set to be equal to the weight corresponding to the second head count D2, that is, it is set f1=f2=0.5, so as to perform weighted averaging calculation, and D3 acquired through the calculation can reflect the actual head count change condition more accurately relative to D1 or D2 in most cases.

Continuing with reference to FIG. 1, in this embodiment, the air conditioning control module 150 may send an instruction to control an HVAC 190 based on the acquired weighted average D3, and the HVAC 190 then controls the dynamic change of the air conditioning system to improve the comfort degree of air in the floor area 91m. The specific type and control principle of the HVAC 190 are not limiting. For example, when D3 reflects that the head count increase is large, the fresh air quantity is increased or the like, and when D3 reflects that the head count reduction is large, to save the energy, the fresh air quantity may be reduced or the like.

In the process of the air conditioning control module 150 sending the instruction, the weighted average D3 acquired based on the head count correction sub-module 153 reflects the actual head count change of the floor area 91m as real as possible, and therefore, the control is more accurate, and better comfort degree of air is more easily acquired.

Continuing with reference to FIG. 1, in an embodiment, the weighted average D3 acquired by the head count correction sub-module 153 is stored in a database 170 of the building air conditioning control system 10 in real time. The database 170 may be used for storing the weighted average D3 of the head count change data corresponding to time, thereby acquiring historical data reflecting the head count change of the floor area 91m. Corresponding to the database 170, the air conditioning control module 150 is further configured with a head count prediction sub-module 155, which is used for acquiring the historical data from the database 170 to predict a head count value (a predicted head count value) of the floor area 91m in a certain period of time in future. Moreover, the air conditioning control module 150 controls the comfort degree of air in the corresponding floor area 91m based on the head count value acquired through prediction. For example, when it is predicted that the head count will be increased in a future time interval (the head value acquired through prediction is increased), the fresh air quantity may be increased properly, and in this way, an instruction is sent to the HVAC 190 to control the air conditioning system before arrival of a large number of persons, thereby improving the comfort degree of users.

It should be noted that, the historical data is acquired based on the weighted average D3, and it may be historical data of head count change data, and may also be the head count value of the current floor area acquired through calculation on the head count change data. The historical data may form a two-dimensional curve of "head count change data-time", and may also form a two-dimensional curve of "head count-time".

For example, the database 170 stores the weighted average D3 of the head count change data of each floor area according to a certain time interval (such as 1 minute, 5 minutes, or 10 minutes), and therefore, the head count condition in the same time interval every day may be acquired through statistics, proportions of the number of days having different head count ranges and the total number of days are calculated, and the head count value having the maximum proportion is used as the predicted head count value of each time interval. For example, in the past one month, for a certain floor area, in 60% of the month, the head count at 10:00 every day is greater than 50, in 30% of the month, the head count at 10:00 every day is between 30 and 50, and in 10% of the month, the head count at 10:00 every day is less than 30. Therefore, the predicted head count value at 10:00 every day is more than 50. The statistics may also be made in the period of a week, and in the same time interval, only the head count of the same weekday every week is taken into statistics, and different weekdays have different predicted head count values. For example, the historical data at 10:00 every Monday in the past is taken into statistics, so as to acquire a predicted head count value at 10:00 on Monday, and the historical data at 10:00 every Tuesday in the past is taken into statistics, so as to acquire a predicted head count value at 10:00 on Tuesday.

It should be noted that, to accurately predict the head count value of a floor area at a certain time point, the statistical method employed is not limited to the above examples, and persons skilled in the art may also predict the head count value based on the weighted average D3 of historical records according to other statistical methods.

The head count prediction sub-module 155 enables the control of the air conditioning system to be more intelligent, and can relatively improve the comfort degree of air in the floor area accurately in advance, thereby solving the problem of accommodative lag in the conventional control method, and greatly improving the user experiences.

Figure 2:
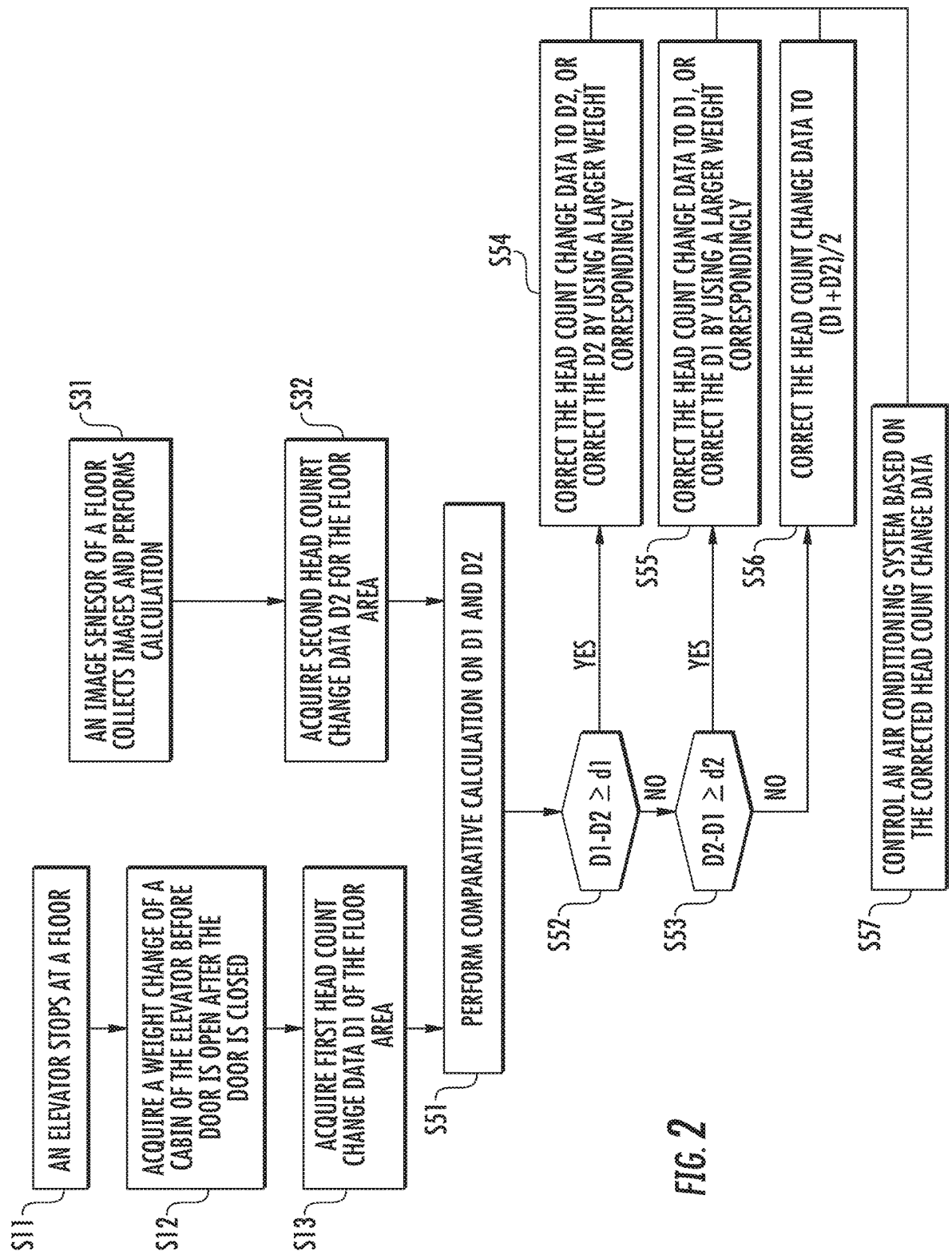
FIG. 2 is a schematic flowchart of a control method of the building control system shown in FIG. 1.

FIG. 2 shows a schematic flowchart of a control method of the building control system shown in FIG. 1. The working principle and control method of the building air conditioning control system in the embodiment shown in FIG. 1 is further illustrated below with reference to FIG. 2.

In the control method, statistical counting from an elevator system and statistical counting from an image sensor are acquired concurrently, that is, first head count change data D1 and second head count change data D2 are acquired concurrently.

For the elevator system, first in step S11, the elevator stops at a floor (for example, a floor area 91*m*); then, in step S12, weight change data of a cabin of the elevator before the door is open and after the door is closed is acquired, and specifically, the weight change data 821 may be acquired by a weight sensor 82 on the cabin 81 shown in FIG. 1; further, in step S13, first head count change data D1 of the floor area (for example, the floor area 91*m*) is acquired, and specifically, the first head count change data D1 of the floor area 91*m* may be acquired by dividing the weight change data 821 by the average weight of human, and the first head count change data D1 indicates a statistical head count of the floor area 91*m* acquired from the elevator system.

For the image sensor of a floor, first in step S31, an image sensor of a floor collects images and performs calculation processing, and specifically, the calculation processing is processing acquired video information to acquire the number of persons leaving the floor area and the number of persons entering the floor area in a certain period of time, and the calculation processing process may be implemented in the image sensor 83 shown in FIG. 1, thereby saving data transmission bandwidth to the second head counting module 130. Definitely, the calculation processing may also be implemented in the second head counting module 130. Further, in step S32, second head count change data D2 of the floor area is acquired.

In this way, data D1 and D2 may be output dynamically in real time respectively by the first head counting module 110 and the second head counting module 130.

Further, in step S51, a comparative calculation is performed on the data D1 and the data D2. It should be noted that, when the data D1 and D2 are negative values, they indicate the number of persons leaving the floor area, and in the comparative calculation process, absolute values thereof are taken to perform the comparative calculation.

Further, in step S52, it is determined whether $D1-D2 \geq d1$.

If the determination is "Yes", it is very likely corresponding to the case in which the weight change data is very large since the passengers carry heavy goods, and D1 is counted as being overly large. The goods and passengers are easily distinguished by means of the video information acquired by the image sensor 83, and the data D2 acquired by video counting is relatively more accurate. Therefore, step S54 is performed, in which the head count change data is corrected to D2, or correspondingly, D2 is corrected by using a larger weight, so as to acquire a weighted average D3 of the head count change data.

If the determination is "No", step S53 is performed to determine whether $D2-D1 \geq d2$.

In the step S53, if the determination is "Yes", it is very likely corresponding to the case in which image data is acquired by the image sensor 83 in a special environment condition and D2 is counted as being overly large. The weight change data acquired by the weight sensor 83 of the elevator can relatively reflect the actual head count change condition more accurately, that is, the data D1 acquired by the elevator counting is relatively more accurate. Therefore, step S55 is performed, in which the head count change data is corrected to D1, or correspondingly, D1 is corrected by using a larger weight, so as to acquire a weighted average D3 of the head count change data.

If the determinations of the step S52 and the step S53 are both "No", it indicates that errors are obviously less than the above two cases even though D1 or D2 each have some uncertainty; therefore, step S56 is performed, in which the head count change data is corrected to (D1+D2)/2; that is, it is set that the weight corresponding to the first head count change data D1 equals to the weight corresponding to the second head count D2, and the weighted average D3 of the head count change data is acquired through calculation.

Further, in step S57, the air conditioning system is controlled based on the head count change data corrected by the step S54, S55 or S56. In other words, the air conditioning control module 150 sends an instruction to the HVAC 190 based on the weighted average D3, so as to adjust the comfort degree of air.

The steps S51 to S57 may be implemented in the air conditioning control module 150 shown in FIG. 1. It should be pointed out that, the sequence of the determination steps S52 and S53 is not limiting, and in another alternative embodiment, step S53 may be performed prior to step S52.

The building control system and the control method thereof in the present invention are mainly illustrated in the above examples. Some implementation manners of the present invention are merely described; however, persons of ordinary skill in the art should understand that the present invention may be implemented in many other forms without departing from the substance and scope thereof. Therefore, the displayed examples and implementation manners are considered as schematic instead of limiting, and the present invention may cover various modifications and replacements without departing from the spirit and scope of the present invention defined in the accompanying claims.

The invention claimed is:

1. A building air conditioning control system, for controlling the comfort degree of air in at least one floor area of the building, comprising:
    a first head counting module, for calculating to acquire first head count change data of the floor area according to a weight change of a cabin of an elevator when passing the corresponding floor area;
    a second head counting module, for calculating to acquire second head count change data of the floor area according to data acquired by an image sensor mounted in the corresponding floor area; and
    an air conditioning control module, for receiving the first and second head count change data, and configured to: correct head count change data based on the first head count change data and the second head count change data, and control the comfort degree of air in the floor area based on the corrected head count change data;
    wherein, the air conditioning control module is configured to: calculate a weighted average of the head count change data based on the first head count change data and the second head count change data and control the comfort degree of air in the floor area based on the weighted average, wherein weights respectively corresponding to the first head count change data and the second head count change data are determined according to relative sizes of the first head count change data and the second head count change data.

2. The building air conditioning control system according to claim 1, wherein, the air conditioning control module is further configured to:
    when a difference between the first head count change data and the second head count change data is greater than or equal to a first predetermined value, a weight corresponding to the second head count change data is 1 or a weight corresponding to the second head count change data is greater than a weight corresponding to the first head count; and
    when a difference between the second head count change data and the first head count change data is greater than or equal to a second predetermined value, a weight corresponding to the first head count change data is 1 or a weight corresponding to the first head count change data is greater than a weight corresponding to the second head count.

3. The building air conditioning control system according to claim 2, wherein, when the difference between the first head count change data and the second head count change data is less than the first predetermined value and the difference between the second head count change data OD and the first head count change data is less than the second predetermined value, the weight corresponding to the first head count change data is equal to the weight corresponding to the second head count.

4. The building air conditioning control system according to claim 1, wherein, the air conditioning control module is configured to comprise:
    a comparative calculation sub-module, for performing comparative calculation on the first head count change data and the second head count change data to acquire the relative sizes of the first head count change data and the second head count change data; and
    a head count correction sub-module, for calculating the weighted average of the head count change data based on the first head count change data and the second head count change data.

5. The building air conditioning control system according to claim 4, wherein, the building air conditioning control system further comprises a database, for storing the weighted average of the head count change data corresponding to time to acquire historical data reflecting a head count value of the corresponding floor area.

6. The building air conditioning control system according to claim 5, wherein, the air conditioning control module is further configured to comprise: a head count prediction sub-module, for acquiring the historical data from the database to predict a head count value at a certain time;
    and the air conditioning control module is further configured to control the comfort degree of air in the floor area based on the predicted head count value.

7. The building air conditioning control system according to claim 1, wherein, the weight change is acquired by a weight sensor mounted on the cabin.

8. The building air conditioning control system according to claim 1, wherein, the image sensor is a 3D sensor or a 2D smart IP camera mounted at a position applicable to acquire head count change conditions of the corresponding floor area.

9. The building air conditioning control system according to claim 1, wherein, the air conditioning control module is coupled with an HVAC of an air conditioning system.

10. A control method of a building air conditioning control system, comprising:
    calculating to acquire first head count change data of a floor area according to a weight change of a cabin of an elevator when passing the corresponding floor area;
    calculating to acquire second head count change data of the floor area according to data acquired by an image sensor mounted in the corresponding floor area; and
    correcting head count change data based on the first head count change data and the second head count change data, and controlling the comfort degree of air in the floor area based on the corrected head count change data;
    wherein, in the process of correction, a weighted average of the head count change data is calculated based on the first head count change data and the second head count change data, and the comfort degree of air in the floor area is controlled based on the weighted average, wherein weights respectively corresponding to the first head count change data and the second head count change data are determined according to relative sizes of the first head count change data and the second head count change data.

11. The control method according to claim 10, wherein:
    when a difference between the first head count change data and the second head count change data is greater than or equal to a first predetermined value, a weight corresponding to the second head count change data is 1 or a weight corresponding to the second head count change data is greater than a weight corresponding to the first head count; and when a difference between the second head count change data and the first head count change data is greater than or equal to a second predetermined value, a weight corresponding to the first head count change data is 1 or a weight corresponding to the first head count change data is greater than a weight corresponding to the second head count.

12. The control method according to claim 11, wherein:
when the difference between the first head count change data and the second head count change data is greater than the second predetermined value and the difference between the second head count change data and the first head count change data is less than the second predetermined value, the weight corresponding to the first head count change data is equal to the weight corresponding to the second head count.

13. The control method according to claim 11, wherein, the size of the first predetermined value is determined according to a head count statistical error condition caused when the elevator carries goods; and the size of the second predetermined value is determined according to a head counting error condition acquired by the image sensor in a special environment condition.

14. The control method according to claim 10, further comprising storing the weighted average of the head count change data corresponding to time to acquire historical data reflecting a head count values of the corresponding floor area.

15. The control method according to claim 14, wherein, the historical data is acquired from the database to predict a head count value at a certain time, and the comfort degree of air in the floor area is controlled based on the predicted head count value.

* * * * *